Oct. 16, 1962 W. J. HUBER 3,058,272
METHOD AND APPARATUS FOR PACKAGING GRANULAR MATERIALS
Filed March 21, 1960 3 Sheets-Sheet 1
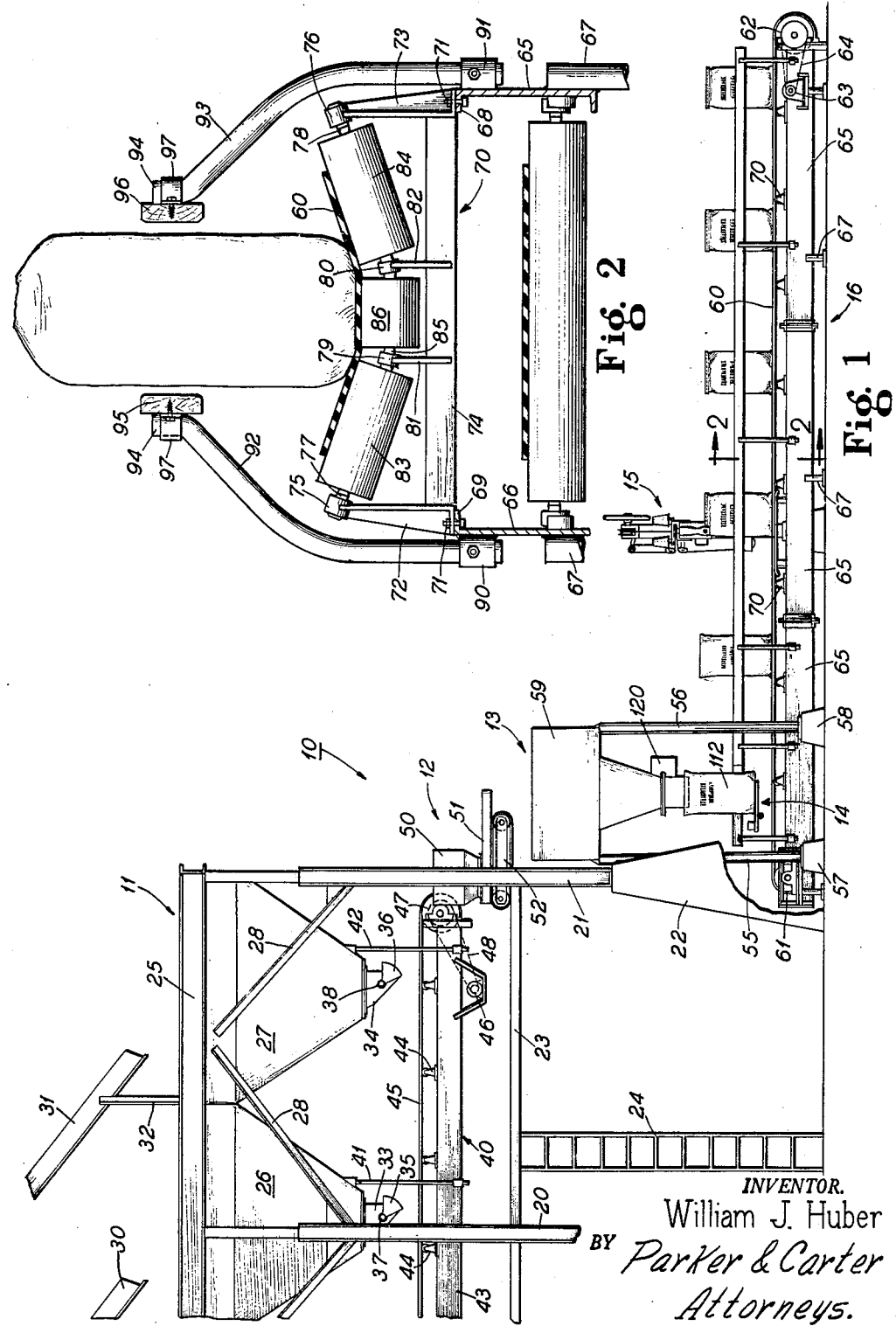
INVENTOR.
William J. Huber
BY *Parker & Carter*
*Attorneys.*

Oct. 16, 1962 W. J. HUBER 3,058,272
METHOD AND APPARATUS FOR PACKAGING GRANULAR MATERIALS
Filed March 21, 1960 3 Sheets-Sheet 2

INVENTOR.
William J. Huber
BY Parker & Carter
Attorneys.

Oct. 16, 1962     W. J. HUBER     3,058,272
METHOD AND APPARATUS FOR PACKAGING GRANULAR MATERIALS
Filed March 21, 1960     3 Sheets-Sheet 3

INVENTOR.
William J. Huber
BY Parker & Carter
Attorneys.

3,058,272
METHOD AND APPARATUS FOR PACKAGING GRANULAR MATERIALS
William J. Huber, Oak Lawn, Ill., assignor to Goodman Manufacturing Company, Chicago, Ill., a corporation of Illinois
Filed Mar. 21, 1960, Ser. No. 16,333
12 Claims. (Cl. 53—37)

The invention relates to the packaging of bulk materials, and particularly to a method and apparatus for bagging granular materials such as sand, gravel, or the like.

Many packaging systems are known for bagging bulk granular materials. In general, however, these systems are rather cumbersome and involve a large number of moving parts whose operation must be rather carefully interrelated. In one known sand bagging system, for example, material from storage bins must travel over four separate conveyors before it is finally discharged from the system. Since the capacity and power requirements of the conveyors differ, each conveyor requires its own power system and this, of course, increases the cost of the system as well as the opportunities for breakdown.

Accordingly, a primary object of this invention is to provide a packaging system for bagging bulk materials which is structurally simple and can be continuously operated at a speed limited only by the rate of feed of bags into the system.

Another object is to provide a packaging system for bulk materials which bags accurately weighed homogenous or mixed batches of material.

Yet another object is to provide a system for bagging bulk materials in which the receptacles containing the bagged material are sewn shut as they pass along a discharge conveyor, thus eliminating a separate sewing conveyor.

Yet another object is to provide a system for bagging bulk materials in which the loaded bags at the filling and dumping station are automatically transferred to a discharge conveyor by gravity and removed from the dumping platform by the friction between the bag and the discharge conveyor belt.

Yet a further object is to provide a dumping apparatus particularly adapted for use in a bulk bagging system which is operable to quickly and accurately deposit bagged materials either manually or automatically onto a flexible conveyor belt without engaging the belt and with minimum impact.

Yet another object of the invention is to provide a method of quickly and efficiently bagging bulk materials such as sand in which a variable input quantity flow rate is continuously discharged as uniformly weighed and bagged batches at regular intervals.

Yet another object is to provide a method of bagging bulk materials in which the bags of materials are filled and sewn in one continuous operation.

The invention is illustrated more or less diagrammatically in the accompanying drawings, wherein:

FIGURE 1 is an elevational view partly schematic and with portions broken away for purposes of clarity illustrating one embodiment of the invention;

FIGURE 2 is a section taken substantially along the line 2—2 of FIGURE 1;

Like reference numerals will be used to refer to like parts throughout the following description of the drawings.

Figure 3:
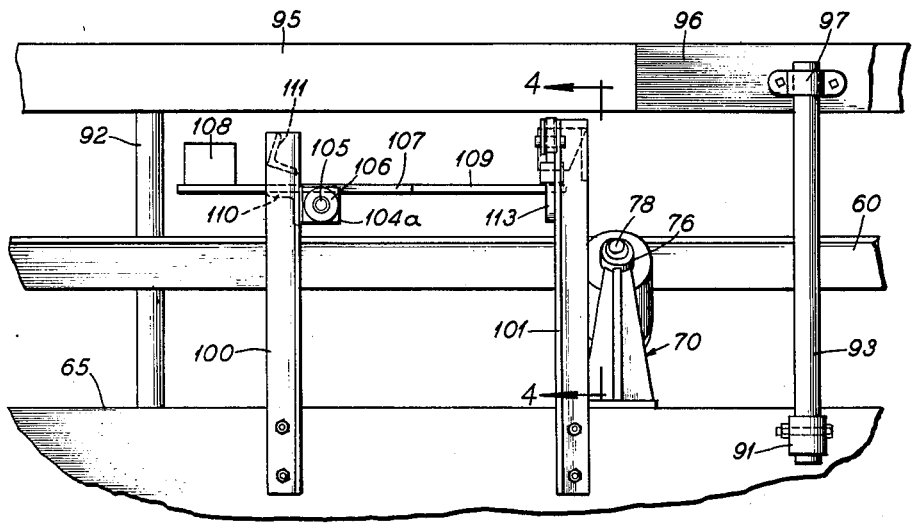
FIGURE 3 is a partial side view to an enlarged scale of a portion of the system illustrating the dumping platform at the filling and dumping station.

The packaging system is indicated generally at 10 in FIGURE 1. It consists essentially of a storage unit 11, a flow modulating unit 12, a flow conversion and weighing unit 13, a filling and dumping station 14, a closure unit 15, and a discharge conveyor 16.

The storage unit 11 consists essentially of a framework comprising a plurality of vertically positioned steel beams 20, 21 anchored in foundations 22. A platform 23 is supported by the beams and ladder 24 provides access to the platform. Beams 20, 21 extend upwardly a substantial distance above the platform and terminate in a horizontal framework 25 from which a plurality of supply bins 26, 27 are suspended. Struts or braces 28 extend from the upright posts 20, 21 to the bins 26, 27 to provide additional support. Material to be bagged is supplied to the bins from any suitable sorting and classifying apparatus such as a classifying screen whose discharge spouts are indicated generally at 30, 31. The spouts are steadied by suitable vertical braces indicated generally at 32. Although only two bins have been shown, it will be understood that a greater or lesser number adapted to receive similar or different types of bulk materials may be provided. The exact number of bins and their storage characteristics are not essential to an understanding of the invention.

Each bin terminates in a delivery spout 33, 34 which may be alternately opened and closed by shutters 35, 36 pivotable about pivot points 37, 38. Any suitable mechanism, not shown, may be utilized to swing the shutters upwardly from their illustrated closed position to permit the material to be discharged from the delivery spouts.

A gathering conveyor is indicated generally at 40. In this instance the conveyor has been shown suspended by hangers 41, 42 from the bins 26, 27. Although the particular type of conveyor is not an essential part of the invention, it has been found convenient to utilize a rigid sideframe conveyor composed essentially of rigid side channel members 43 to which non-flexing troughed idler assemblies 44 are attached. The idler assemblies in turn support a flexible conveyor belt 45 which is continuously moved at a substantially constant speed by motor 46 which drives end pulley 47 through belt 48.

The flow modulating unit 12 comprises essentially a surge hopper 50, a deflector plate 51, and a continuously rotating conveyor 52. Although the details of the conveyor are not illustrated, it will be understood that it may be a conventional bucket conveyor or a belt conveyor driven by a self-contained power unit, the belt or bucket chain being trained around a pair of end pulleys, not numbered. The deflector plate, in turn, is generally horizontally slidable to vary the direction of discharge from the unit.

Flow conversion and weighing unit 13 comprises a plurality of vertical posts 55, 56 anchored in bases 57, 58 which support, at their upper ends, a packer indicated generally at 59. The details of the packer are not essential to an understanding of the invention. Its primary function is to convert a variable volumetric rate of flow of material from conveyor 40 into batches of material, each batch being of substantially the same weight.

Filling and dumping station 14 is described in detail hereinafter.

The discharge conveyor 16 comprises essentially a conveyor belt 60 trained around end pulleys 61, 62 which are driven by a suitable motor and chain drive 63, 64. The supporting structure for the conveyor consists essentially of a pair of rigid sideframes 65, 66 supported at intervals by short posts 67. The rigid sideframes in this instance are shown as channel beams whose upper flanges 68, 69 are directed inwardly towards the center of the conveyor. The sideframes are maintained a fixed distance apart by a plurality of troughed idler assemblies 70 which are bolted as at 71 to the upper inturned flanges.

A typical troughed idler assembly is illustrated in FIGURE 2. In this instance the assembly comprises a pair of stanchions 72, 73 which are maintained a fixed distance apart by a rigid cross brace 74. The cross strut, of course, serves the dual function of maintaining stanchions 72, 73 and rigid side frames 65, 66 a fixed distance apart. A pair of bearings 75, 76 are welded to the upper ends of the stanchions and receive the outer ends of a pair of wing roller shafts 77, 78. The inner ends of the wing roller shafts in turn are journalled in a pair of bearings 79, 80 which are supported by struts 81, 82 from the cross brace 74. Wing rollers 83, 84 are supported by suitable bearings on the shafts 77, 78. The shafts may be rotatable or non-rotatable, but the rollers are, of course, rotatable. Inner bearings 79, 80 also support center roller shaft 85 which carries roller 86.

A plurality of collars 90, 91 are welded or otherwise suitably secured at substantially regular intervals to the outside of side frames 65, 66. Each collar receives a tubular member 92, 93 which extends upwardly, then inwardly, and terminates in a short vertical portion 94. A pair of guide rails 95, 96 are secured to the upper terminal portions of the tubular members by yokes 97.

Figure 4:
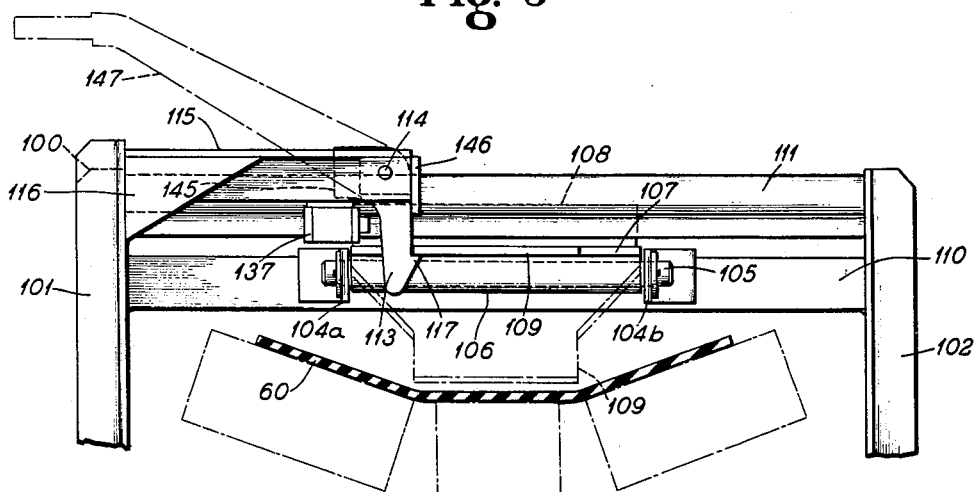
FIGURE 4 is a view taken substantially along the line 4—4 of FIGURE 3.
Figure 5:
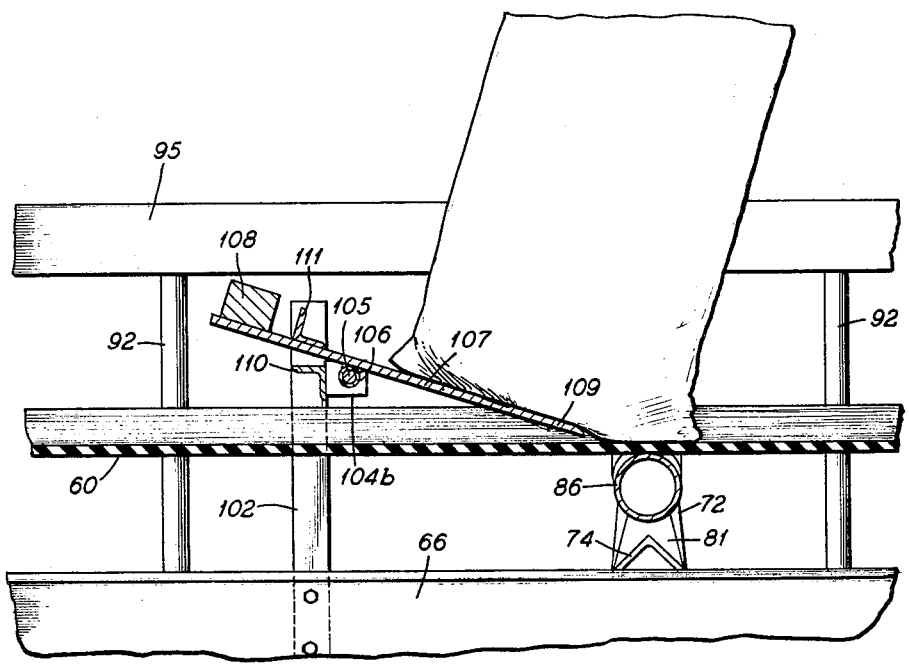
FIGURE 5 is a sectional view illustrating the dumping platform in a discharging position.

The filling and dumping station indicated generally at 14 in FIGURE 1 is illustrated in somewhat more detail in FIGURES 3, 4 and 5. It includes a dumping platform which consists essentialy of three L-beams 100, 101, and 102, which are bolted at their lower ends to the side frames 65, 66 and extend upwardly to above the level of the conveyor belt 60. Brackets 104a, 104b are welded or otherwise suitably secured to a transverse L-channel 110. A shaft 105 is journaled in brackets 104a, 104b and carries a sleeve 106 which in turn is welded to the underside of the dumping platform 107. The sleeve and platform are free to rotate around the shaft from the filling position of FIGURE 3 to the dumping position of FIGURE 5. The trailing edge of the platform carries a counterweight 108. As best seen in FIGURE 4, the dumping platform extends the full distance between the brackets, then tapers inwardly for a short distance in the direction of conveyor belt travel, and terminates in a tongue or tab 109 whose width is substantially less than the span between the brackets. L-channels 110, 111 provide positive stops which limit the pivotal movement of the platform 107 about shaft 105.

When the dumping platform carries no load, counterweight 108 and channel 110 maintain the platform in the substantially horizontal position illustrated in FIGURE 3. When a bag 112 is placed on the platform and material dumped into it from the weighing unit 13, it is necessary to use holding means for maintaining the platform level until the bag is completely filled.

Figures 6, 7:
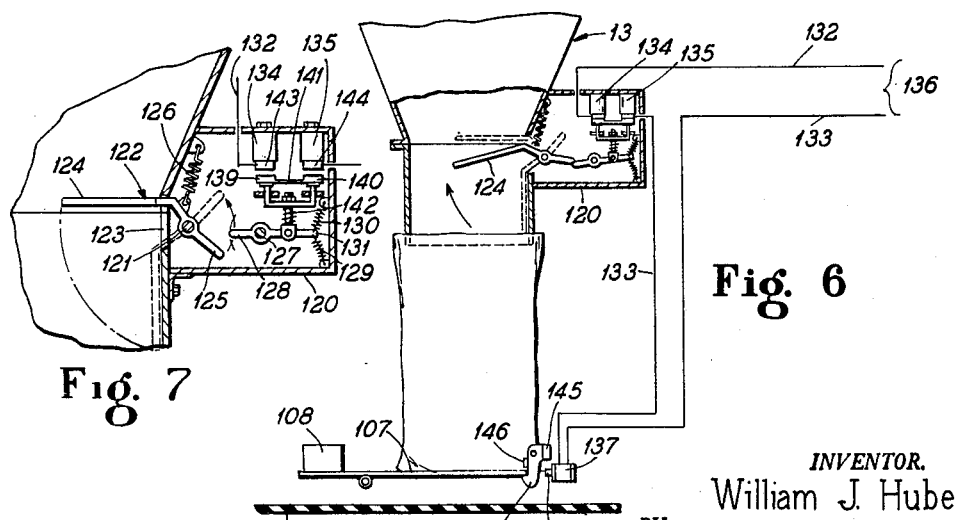
FIGURE 6 is a partly schematic view of mechanism for automatically depositing a filled receptacle onto the discharge conveyor.
FIGURE 7 is a detail view to an enlarged scale of a portion of the mechanism of FIGURE 6.

Two forms of holding means are illustrated in FIGURES 4, 6 and 7. In each instance, a downwardly projecting dog 113 is pivoted, as at 114, to an inwardly extending strut 115 welded at its outer end to forward stanchion 101. A triangular support piece 116 is welded to the stanchion and struts 115 to provide additional stability. The lower end of dog 113 has an inwardly extending tooth 117 upon which one edge of tongue 109 of the dumping platform rests. So long as the dog is in the position illustrated in FIGURE 4, the loaded bag cannot be dumped onto the conveyor.

FIGURE 4 illustrates manual mechanism for releasing the dumping platform when a batch of material has been deposited on it from the weighing unit 13, and FIGURES 6 and 7 illustrate automatic mechanism to accomplish the same result.

The automatic dumping mechanism includes a housing 120 secured to one side of the lower portion of the weighing unit 13, as illustrated best in FIGURE 1. A shaft 121 is journaled in suitable bearings in the housing wall 120, and carries a paddle 122 which extends into the weighing unit through an aperture 123. The inner end 124 of paddle 122 extends into the flow path of the bulk material as it leaves the weighing unit, and the outer end 125 extends into the housing 120. The upper end of a restoring spring 126 is secured to the outside of the weighing unit and the lower end to the outer portion of the paddle 122. The spring is biased to urge the paddle into the solid line position of FIGURE 7.

A second shaft 127 is suitably journaled in the housing and carries a circuit lever whose inner or impact end 128 extends into the path of movement of outer end 125 of paddle 122 as best illustrated in FIGURE 7. A pair of restoring springs 129, 130 urge the outer end 131 of the circuit lever to the solid line position of FIGURE 7. A pair of wires 132, 133 lead to terminals 134, 135 secured to the upper wall of the housing from a source of power 136. Line 133 passes through an electro-magnet 137 whose armature 138 is aligned with downwardly extending dog 113. A pair of contacts 139, 140 connected by conductor 141 are supported by a reciprocable frame 142 in line with contacts 143, 144 of terminals 134, 135. Suitable insulators, not numbered, isolate contacts 139, 140 and conductor 141 from the balance of the frame.

A counterweight is indicated generally at 145 and serves to urge the dog 113 into the position of FIGURE 6. A suitable stop 146 prevents the dog from moving past the position of FIGURE 6. It will be understood that the position of dog 113 has been transposed from FIGURE 4 to FIGURE 6 for purposes of description only.

Manual means for pivoting dog 113 into a dumping position are shown in phantom in FIGURE 4. In this figure, a handle 147 extends upwardly and outwardly towards the side of the conveyor so that clockwise rotation of the handle by an operator will move the dog 113 to the left, as viewed in FIGURE 4.

The use and operation of the invention is as follows:

The apparatus disclosed in FIGURES 1 through 7 makes possible continuous bagging of bulk materials such as sand or gravel in mixtures of predetermined ratios, or in homogenous batches.

Bulk material to be bagged drops from any suitable processing station, such as a classifying screen, from discharge spouts 30, 31 into storage bins 26, 27. Assuming that homogenous batches are to be bagged, the shutter 35 of storage bin 26 is swung about its pivot 37 to gravitally discharge material onto the traveling conveyor belt 45. The belt dumps the material into the surge hopper 50 of flow modulating unit 12. The surge hopper 50, deflector plate 51, and traveling conveyor belt 52 cooperate in a well-known manner to discharge a steady state, uniform quantity flow rate of material into the packer 59 of the flow conversion and weighing unit 13. In effect, the flow modulating unit 12 changes the somewhat variable discharge from belt 45 into a steady state discharge.

Flow conversion and weighing unit 13 operates in a well known manner to convert the steady state input into batches of material, each of equal weight, and discharges the batches into bags 112 resting on the dumping platform 107.

In the manual operation of the device, counterweight 147 urges dog 113 counterclockwise so that the dumping platform 107 is maintained horizontal by tooth 117. When the batch has been completely deposited in the bag, the operator rotates the handle 147 upwardly or clockwise to release the tooth 117. The weight of filled bag immediately tilts the dumping platform 107 downwardly to the position of FIGURE 5, since its weight is considerably greater than counterweight 108. The counterweight returns the dumping platform to a horizontal position as soon as the belt 60 pulls the bag completely off the platform.

For automatic operation, the mechanism of FIGURES 6 and 7 is utilized. As the weighed batch of material passes from the conversion and weighing unit 13 downwardly into the bag 112, it trips lever 124 and moves it from the solid line to the dotted line position of FIGURE 7. When the outer end 125 of paddle 122 moves counterclockwise from the solid to the dotted line position, it pushes the impact end 128 of the circuit lever clockwise, thus pulling contacts 139, 140 further away from terminals 134, 135. Stabilizing springs 129, 130 prevent the contacts from striking the terminals. When the batch of material passes paddle 122, restoring spring 126 moves the paddle from the dotted to the solid line position. As the outer end 125 moves from the dotted to the solid line position, it strikes the impact end 128 of the circuit lever moving the contacts 139, 140 upwardly into contact with terminals 134, 135. This momentarily completes a circuit through line 132, terminal 134, contact 139, conductor 141, contact 140, terminal 135, line 133, and electro-magnet 137. Energization of the electro-magnet retracts its armature 138 which pulls dog 113 to the right, as viewed in FIGURE 6. The removal of tooth 117 permits the dumping platform 107 to tilt to the position of FIGURE 5.

The leading edge of platform 107 does not strike the conveyor because upper stop means 111 is so positioned that the tip end of tab 109 never contacts the belt. The tongue is considerably narrower than the trailing edge of the platform so it fits easily into the dished contour of the conveyor.

Since the feeding edge of the bag overhangs the edge of the platform, as illustrated in FIGURE 1, it makes contact with the moving conveyor belt even though the dumping platform does not, as clearly illustrated in FIGURE 5. The frictional force between the belt and the bottom of the bag is sufficient to pull the bag off the platform. When the bag leaves the platform, counterweight 108 returns the platform to the position of FIGURE 3. Counterweight 108 exerts a sufficient torque on the platform so that it depresses dog 113 an amount sufficient to permit it to ride up and over the tooth 117 in its upward movement. The impact edge of the dog is slanted to facilitate this movement.

As the bag moves along the conveyor belt, its top is usually folded over when it reaches approximately the position of the second bag in FIGURE 1. When the bag comes opposite the closure unit 15, the operator actuates mechanism which sews the top of the bag shut. It will be noted that the sewing needle is stationary, and that the bag is sewn as it moves along the conveyor.

At the discharge end of the conveyor, the bags may be loaded onto a suitable pallet loader.

To package mixed materials, different sizes or types of bulk material are stored in the bins 26, 27 and two or more discharge onto the conveyor 45 at once. By the time the material has passed through the flow modulating unit and the conversion and weighing unit, it is usually sufficiently mixed. The operation will be substantially the same as that described when a homogeneous mixture is processed.

In the aforementioned system, only two operators are necessary, one to place the bags onto the dumping platform 107, and one to actuate the closure unit 15. It will be readily understood, however, that automatic bag feeding means may be employed and likewise electrical means, such as an electric eye, could be utilized to actuate the sewing machine at an appropriate point in the cycle.

Although two embodiments of the invention have been disclosed, it will be understood that the spirit of the invention is not confined to the precise showing illustrated and described herein. Accordingly, the scope of the invention should not be limited except by the scope of the following appended claims.

I claim:

1. A system for packaging homogeneous and mixed batches of bulk materials, such as, sand, gravel, and the like, said system including first conveyor means arranged to receive bulk materials from one or more sources of supply, a packer arranged to receive the bulk materials from the first conveyor means and to discharge uniform weight batches of the bulk materials, a filling and dumping station adapted to support a material receiving receptacle in a position to receive a batch of weighed material from the packer, said filling and dumping station including a platform tiltable about a generally horizontal axis, a second, generally troughed conveyor, the edge of the platform overlying the second conveyor in the direction of conveyor movement and terminating rearwardly of the normal forward position of a receptacle, the downstream side of the platform being so contoured as to permit the leading edge of the platform to lie closely adjacent the most dished area of the conveyor, whereby the receptacle may be dragged off the platform when the platform tilts to a dumping position, means for depositing a filled receptacle on the conveyor, and closure means for sealing the filled receptacle as it moves along the second conveyor to a discharge point.

2. A system for packaging homogeneous and mixed batches of bulk materials, such as, sand, gravel, and the like, said system including first conveyor means arranged to receive bulk materials from one or more sources of supply, a packer arranged to receive the bulk materials from the first conveyor means and to discharge uniform weight batches of the bulk material, a filling and dumping station adapted to support a material receiving receptacle in a position to receive a batch of weighed material from the packer, a second conveyor, means for depositing a filled receptacle on the second conveyor, said depositing means including a pivoted lever having a counterweight which gravitally urges the lever into a position effective to maintain the tilting platform substantially level, and electromagnetic means effective, when actuated, to swing the lever into a disengaging position, said electromagnetic means including a circuit having an electromagnet positioned to attract the pivoted lever to a disengaged position when actuated, a contact in the circuit, and a mechanical linkage actuated by movement of a batch of material from the packer into a waiting receptacle which completes the circuit to energize electromagnet, and closure means for sealing the filled receptacle as it moves along the second conveyor to a discharge point.

3. A system for continuously bagging bulk material such as sand, gravel and the like, said system including, in combination, a first conveyor positioned to receive a variable volumetric flow of bulk material from a source of supply, means for converting the variable volumetric flow of bulk material from the first conveyor into batches of substantially uniform weight, a filling station, said filling station being adapted to support a bag in a position to receive a batch of weighed material from the converting means, a second conveyor, said second conveyor being continuously movable towards a discharge point, means for placing a filled bag on the second conveyor after it has received a batch of weighed material, and means for closing the filled bags as they move along the second conveyor to the discharge point.

4. The packaging system of claim 3 further including means for supporting the filling station out of contact with the second conveyor means at all times, including during the placement of filled bags on the second conveyor.

5. A system for packaging and continuously discharging homogeneous and mixed batches of bulk materials such as sand, gravel, and the like, said system including first conveyor means arranged to receive bulk materials from one or more sources of supply, a packer arranged to receive the bulk materials from the first conveyor means and to discharge uniform weight batches of the bulk material therefrom, means for modulating the flow of bulk material between the first conveyor means and the packer to thereby discharge the material into the packer at a substantially constant quantity flow rate, said flow modulating means comprising an intermediate storage container positioned to receive the bulk material from the first conveyor and to discharge into a feeder conveyor, said feeder conveyor means having means cooperable with the intermediate storage container for converting surge loads in the intermediate storage container into a constant quantity flow rate and to discharge the bulk material into the packer, a filling and dumping station adapted to support a material receiving receptacle in a position to receive a batch of weighed material from the packer, a second conveyor being continuously movable toward a discharge point, means for placing a filled receptacle on the second conveyor, and closure means for closing the filled receptacle as it moves along the second conveyor to the discharge point.

6. A system for packaging and continuously discharging homogeneous and mixed batches of bulk material such as sand, gravel, and the like, said system including first conveyor means arranged to receive bulk material from one or more sources of supply, a packer arranged to receive the bulk material from the first conveyor means and to discharge uniform weight batches of the bulk material therefrom, a second conveyor, said second conveyor being continuously movable toward a discharge point, a filling and dumping station adapted to support a material receiving receptacle in a position to receive a batch of weighed material from the packer, said filling and dumping station comprising a platform tiltable about a generally horizontal axis to a position in which the edge of the platform overlying the second conveyor in the direction of conveyor movement is positioned close to said second conveyor, said edge of the platform terminating rearwardly of the normal forward position of a receptacle whereby the receptacle may be dragged off the platform due to impingement of the forward edge of the receptacle on the second conveyor when the platform tilts to a dumping position, means for depositing a filled receptacle on the second conveyor, and closure means for closing the filled receptacle as it moves along the second conveyor to the discharge point.

7. A system for packaging and continuously discharging homogeneous and mixed batches of bulk material such as sand, gravel, and the like, said system including first conveyor means arranged to receive bulk material from one or more sources of supply, a packer arranged to receive the bulk material from the first conveyor means and to discharge uniform weight batches of the bulk material therefrom, a second conveyor, said second conveyor being continuously movable toward a discharge point, a filling and dumping station adapted to support a material receiving receptacle in a position to receive a batch of weighed material from the packer, said filling and dumping station comprising a counterweighted platform tiltable about a generally horizontal axis to a position in which the edge of the platform overlying the second conveyor in the direction of conveyor movement is positioned close to said second conveyor, said edge of the platform terminating rearwardly of the normal forward position of a receptacle whereby the receptacle may be dragged off the platform due to impingement of the forward edge of the receptacle on the second conveyor when the platform tilts to a dumping position means for depositing a filled receptacle on the second conveyor, said filling and dumping station further including first and second stop means for limiting the upward and downward displacement of the tilting platform, and closure means for closing the filled receptacle as it moves along the second conveyor to the discharge point.

8. A system for packaging and continuously discharging homogeneous and mixed batches of bulk material such as sand, gravel, and the like, said system including first conveyor means arranged to receive bulk material from one or more sources of supply, a packer arranged to receive the bulk material from the first conveyor means and to discharge uniform weight batches of the bulk material therefrom, a filling and dumping station adapted to support a material receiving receptacle on a platform in a position to receive a batch of weighed material from the packer, a second conveyor, said second conveyor being continuously movable toward a discharge point, means for depositing a filled receptacle on the second conveyor, said depositing means including a pivoted lever engageable with the platform, said lever being operable, when in engagement with the platform, to maintain it generally horizontal and, when disengaged, to permit tilting of the platform into a discharge position, and closure means for closing the filled receptacle as it moves along the second conveyor to the discharge point.

9. A system for packaging and continuously discharging homogeneous and mixed batches of bulk materials such as sand, gravel, and the like, said system including first conveyor means arranged to receive bulk material from one or more sources of supply, a packer arranged to receive the bulk material from the first conveyor means and to discharge uniform weight batches of the bulk material therefrom, a filling and dumping station adapted to support a material receiving receptacle in a position to receive a batch of weighed material on a platform from the packer, a second conveyor, said second conveyor being continuously movable toward a discharge point, means for depositing a filled receptacle on the second conveyor, said depositing means including a pivoted lever having a counterweight which gravitally urges the lever into a position effective to maintain the tilting platform substantially level, and electro-magnetic means for swinging the lever into a disengaging position, and closure means for closing the filled receptacle as it moves along the second conveyor to the discharge point.

10. A method of packaging bulk material such as sand, gravel, and the like which includes the steps of discharging the material from a source of supply at a variable volumetric flow rate, converting the variable volumetric flow rate into a substantially constant volumetric flow rate, converting the substantially constant volumetric flow rate into a plurality of substantially uniform weight batches of material, discharging each batch into a receptacle at a filling station, and moving the receptacle away from the filling station to an eventual discharge point.

11. The method of claim 10 further including the step of closing each receptacle during its movement toward the discharge point after leaving the filling station.

12. A system for continuously packaging bulk material such as sand, gravel and the like, said system including, in combination,
    a first conveyor positioned to receive a variable volumetric flow of bulk material from a source of supply,
    means for converting the variable volumetric flow of bulk material from the first conveyor into batches of substantially uniform weight,
    a filling station, said filling station being adapted to support a receptacle in a position to receive a batch of weighed material from the converting means,
    a second conveyor, said second conveyor being continuously movable towards a discharge point,
    means for placing a filled receptacle on the second conveyor after it has received a batch of weighed material, and
    means for closing each filled receptacle after it has received a batch of weighed material from the converting means.

References Cited in the file of this patent

UNITED STATES PATENTS 2,097,447     Cundall ---------------- Nov. 2, 1937

FOREIGN PATENTS 1,145,236     France ---------------- Oct. 23, 1957